LINE VOLTAGE FLUCTUATION INSENSITIVE DETECTOR FOR PHASE FAILURES ON THREE PHASE TRANSFORMERS

Filed Dec. 11, 1967 4 Sheets-Sheet 1

INVENTORS
HORST JOSEF HEMPRICH
WALTER FRIEDRICH SCHNEIDER
HANS WILHELM SPIRO
JOACHIM ZEHR

BY Nathan Cass
ATTORNEY

Nov. 18, 1969 H. J. HEMPRICH ET AL 3,479,583

LINE VOLTAGE FLUCTUATION INSENSITIVE DETECTOR FOR PHASE FAILURES ON THREE PHASE TRANSFORMERS

Filed Dec. 11, 1967 4 Sheets-Sheet 2

United States Patent Office 3,479,583

Patented Nov. 18, 1969

3,479,583

LINE VOLTAGE FLUCTUATION INSENSITIVE DETECTOR FOR PHASE FAILURES ON THREE PHASE TRANSFORMERS

Horst J. Hemprich, Sindelfingen, Walter F. Schneider, Gartringen, Hans W. Spiro, Boblingen, and Joachim O. Zehr, Herrenberg, Germany, assignors to International Business Machines Corporation, Armonk, N.Y., a corporation of New York Filed Dec. 11, 1967, Ser. No. 689,717

Claims priority, application Germany, Feb. 4, 1967, J 32,926

Int. Cl. G01r 31/02

U.S. Cl. 324—51 5 Claims

ABSTRACT OF THE DISCLOSURE

A circuit arrangement for the detection of power failures in supplies with three-phase transformers. First and second signals related to the mean D.C. voltage and the peak A.C. voltage of the combined outputs of full-wave rectifiers connected to the transformer secondary windings are derived. Failure of a phase is indicated by applying these first and second signals to a compare circuit comprising a differential amplifier and a zero indicator. An amplifier and associated hysteresis means are provided at the zero indicator output to eliminate "fluttering."

Background of the invention

The invention relates to a circuit arrangement for the detection of power failures on three-phase transformers.

Extensive electrical or electronical equipment is fed in many cases by supplies the primary side of which is linked with a three-phase network via a three-phase transformer. The secondary side of this transformer provides in a known manner the voltages necessary for feeding the equipment connected. These voltages can be either A.C. or D.C. voltages. In a number of cases at least one of the D.C. voltages used must have a high degree of constancy. The constancy of the said voltages governs in intricate cases the operation of the whole system. To eliminate errors and defects it is advisable for power drops and failures to be reliably detected and indicated.

Summary of the invention

The present invention detects failures by a circuit arrangement characterized in that the combined outputs of full-wave rectifiers connected to the secondary side of the transformer are applied to one input of a compare circuit either directly or via a voltage divider and to the other input via a peak voltage rectifier. This measure results in the mean value of a voltage which is proportional to the D.C. voltage supplied by the rectifier circuit being compared with the peak value of the A.C. voltage superposing the D.C. voltage. If one of the primary phases fails, the ripple of the D.C. voltages on the secondary side increases. In accordance with another embodiment of the invention, the polarity of the D.C. voltage derived from the rectified superposed A.C. voltage is chosen to be identical to the polarity of the mean value with which it is to be compared. In this instance the compare circuit can consist, in accordance with the invention, of a differential amplifier. A further embodiment of the invention is characterized in that the polarity of the D.C. voltage derived via the peak voltage rectifier is opposed to the polarity of the voltage with which it is to be compared, that the voltages to be compared are connected in series and in that a zero indicator is connected to the output of this series arrangement to indicate differences in the voltages to be compared. Yet another embodiment of the invention is characterized in that the output of the compare circuit is connected to an amplifier which switches from one discrete value to another in response to appropriate changes in input level, and in that an additional hysteresis is provided for the amplifier which causes the input level required for switching from state 1 to state 2 and corresponding to a discrete input voltage to be different from the input level required for switching from state 2 to state 1. This measure prevents the amplifier from "fluttering."

The foregoing and other objects, features and advantages of the invention will be apparent from the following more particular description of the preferred embodiments of the invention, as illustrated in the accompanying drawings.

Figure 1:
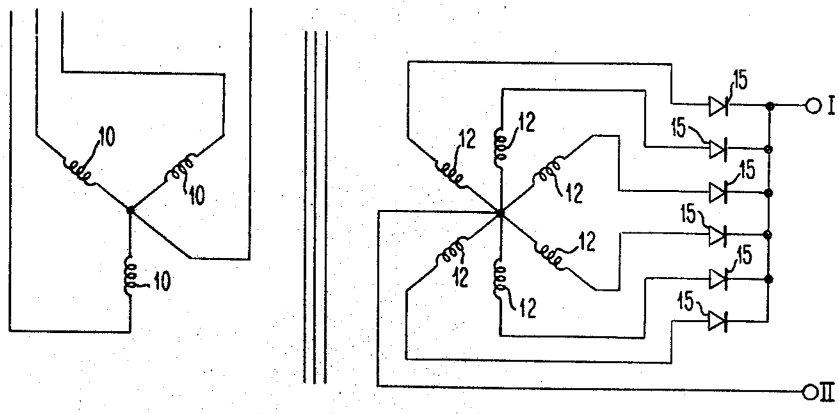
FIG. 1 is a circuit of a three-phase transformer and associated full-wave rectifier means.

As shown in FIG. 1, a three-phase transformer which is to be monitored has three primary windings 10 and, as a rule, several secondary windings 12. The D.C. voltages for the equipment to be fed (not shown) are derived from these secondary windings 12. Normally, each of the secondary windings 12 of the transformer is designed for three-phase full-wave rectification.

Figure 2A:
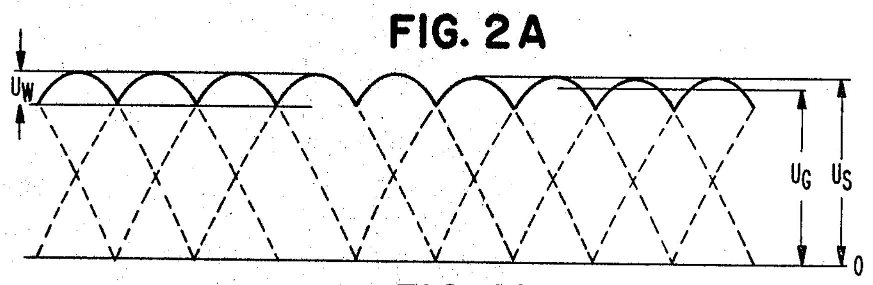
FIGS. 2A, 2B and 2C are graphs illustrating the voltages occurring on the secondary side of the three-phase transformer of FIG. 1.

If a set of rectifiers 15 is connected to the secondary windings 12 as indicated in FIG. 1, a voltage as shown in FIG. 2A occurs on the output terminals I and II of this circuit. For the purposes of this invention no smoothing capacitor is arranged between the terminals I and II. In FIG. 2A, $U_G$ is the mean value of the D.C. voltage betwen the terminals I and II. $U_S$ is the peak value of the D.C. voltage. $U_W$ is the A.C. voltage superposing the D.C. voltage $U_G$ as measured from one peak to another.

If one of the A.C. phases on the primary side fails without single-phase loads being applied to it, the voltage conditions in accordance with FIG. 2A are only slightly altered, which has no bearing on the present invention since the D.C. voltages on the secondary side are maintained at their full rate.

Figure 2B:
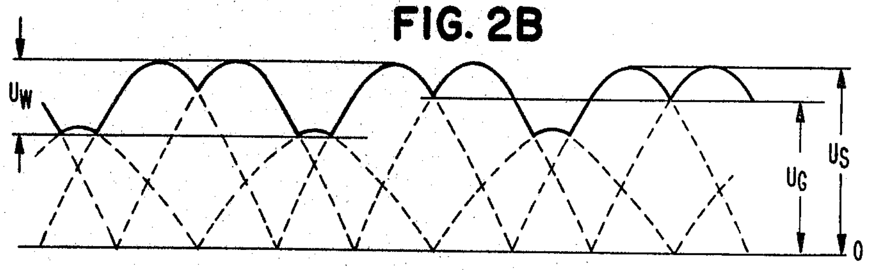

If the transformer is subjected to high loads or if single-phase primary loads are applied to the phase failing, the secondary voltage of the phase failing is caused to collapse by the magnetic linkage and the magnetic unbalance of the transformer.

Where the single-phase load on the phase failing is low, a voltage characteristic in accordance with FIG. 2B results. In the case of high secondary loads and/or high single-phase loads being applied to the phase failing and/or in the case of single-phase undervoltages being forced onto the primary side, the voltage drop on the secondary side can be of an order where a voltage characteristic in accordance with FIG. 2C results.

Figure 2C:
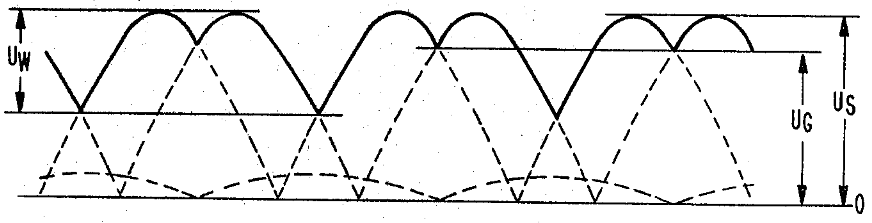

It can be seen from FIGS. 2A–2C that as the magnetic unbalance of the transformer increases the A.C voltage $U_W$ increases substantially, whereas the mean value of the D.C. voltage $U_G$ drops slightly. This becomes obvious from the following:

The parameters are:

$U_S$=peak value of the D.C. voltage (=amplitude of a secondary voltage which has not failed)
$p$=percentage by which the secondary voltage amplitude of the phase which has failed falls below the value $U_S$ and the resulting equations:

$$y=\text{arctg}\frac{100.\sin\frac{\Pi}{3}}{50-p} \tag{1}$$

$$U_W=U_S\cdot\left[1-\sin\left(y\frac{\Pi}{3}\right)\right] \tag{2}$$

$$U_G=U_S\cdot\frac{2}{\Pi}\cdot\left[0.5+\frac{50-p}{100}\cdot\cos y+\sin\frac{\Pi}{3}\cdot\sin y\right] \tag{3}$$

Equations 2 and 3 show that the relationship between $U_W$ and $U_G$ depends upon the undervoltage percentage $p$ of the phase failing, whereas the said relationship is independent of the peak value $U_S$ of the D.C. voltage. This means that the relationship remains unaffected by normal line voltage fluctuations.

Figure 3:
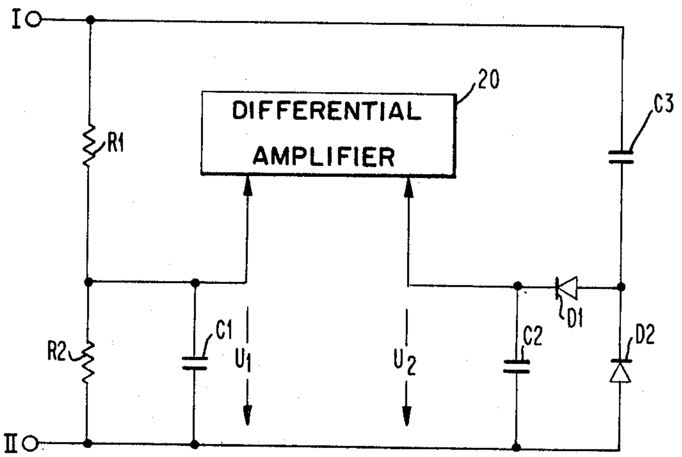
FIG. 3 is an embodiment of the circuit of the invention.

This fact is utilized in that in accordance with the invention the circuit of FIG. 3 is linked with the terminals I and II of the circuit of FIG. 1. One input of a differential amplifier 20 is fed via the voltage dividers R1 and R2, the capacitor C1 being connected in parallel to the divider R2. The other input of the differential amplifier is linked with the terminal I via a peak voltage rectifier comprising the diodes D1 and D2 and the capacitors C2 and C3. The D.C. voltage $U_1$ on the capacitor C1 is proportional to the mean value of the D.C. voltage $U_G$:

$$U_1=U_G\frac{R2}{R1+R2} \tag{4}$$

The D.C. voltage $U_2$ on the capacitor C2 generated by the peak voltage rectifier corresponds to the A.C. voltage $U_W$:

$$U_2=U_W \tag{5}$$

Where no phase has failed, $U_1$ exceeds $U_2$. This condition can be obtained by selecting the voltage dividers R1 and R2 accordingly.

Where a phase fails, the value $U_2$ increases in accordance with FIG. 2 and Equations 1 to 5, whereas $U_1$ decreases slightly. In cases where the undervoltage percentage $p$ of the phase failing can be determined by the voltage dividers R1 and R2, $U_1$ becomes equivalent to $U_2$. Where the voltage drop on the secondary side of the phase failing is more substantial $U_1$ becomes eventually less than $U_2$.

The differential amplifier in FIG. 3 is designed so that it switches between two states $U_1>U_2$ and $U_1<U_2$ and that the relationship required for switching is $U_1=U_2$. The presence of a phase failure is indicated in a simple manner on the output of the differential amplifier in accordance with FIG. 3.

Figure 4:
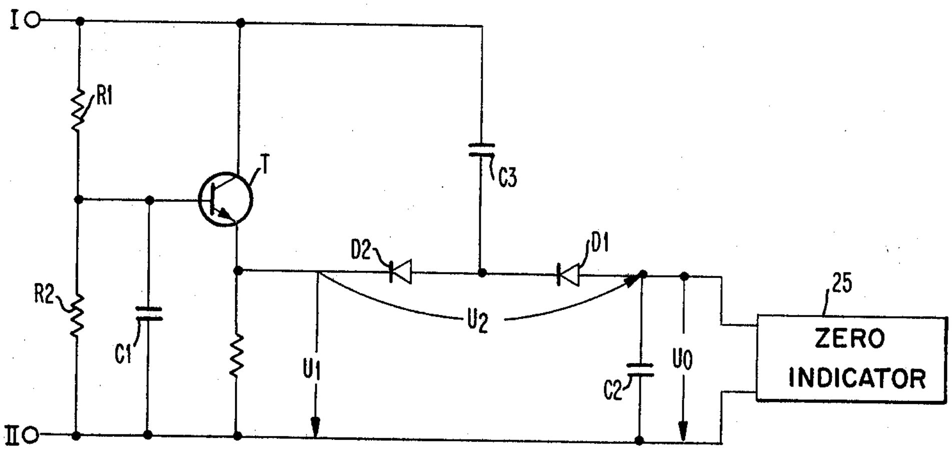
FIG. 4 is another embodiment of the circuit of the invention.

FIG. 4 is another embodiment of the circuit arrangement of the invention. The voltage dividers R1 and R2 on the input determine the voltage $U_1$ in accordance with Equation 4. A connected emitter follower comprising the transistor T renders this voltage greatly load-independent. In addition, the voltage $U_1$ is reduced by the base emitter voltage drop $U_{BE}$. Thus, the following equation applies to the circuit in accordance with FIG. 4:

$$U_1=U_G\cdot\frac{R2}{R1+R2}-U_{BE} \tag{6}$$

The connected rectifier circuit comprising the diodes D1 and D2 and the capacitors C2 and C3 are designed in a manner that a negative voltage $U_0$ occurs on the capacitor C2. The value of this voltage is given by the Equation 5. The reduction in the voltage $U_2$ by the forward voltage drop $U_D$ of the two diodes D1 and D2 is not considered in this equation. The following results:

$$U_2=U_W-U_D \tag{7}$$

In the circuit in accordance with FIG. 4, the diode D2 is not connected to the terminal II as shown in FIG. 3 but is linked with the low-resistivity source $U_1$ so that the two D.C. voltages $U_1$ and $U_2$ are connected in series. The D.C. voltage $U_0$ on the capacitor C2 thus is:

$$U_0=U_1-U_2=U_G\cdot\frac{R2}{R1+R2}-U_W+U_D-U_{BE} \tag{8}$$

Where in a particularly advantageous embodiment T, D1 and D2 are so chosen that $U_D$ is equal to $U_{BE}$, the Equation 8 is to be replaced by $$U_0=U_G\cdot\frac{R2}{R1+R2}-U_W \tag{9}$$

In accordance with the Equation 9, $U_0$, subject to the voltage dividers R1 and R2 being chosen correspondingly, will be positive as long as no phase failure occurs since $$U_G\cdot\frac{R2}{R1+R2}>U_W$$

In the case of a phase failure $U_0$ becomes negative as expressed in the following equation:

$$U_G\cdot\frac{R2}{R1+R2}<U_W$$

Therefore, it is advisable for the voltage $U_0$ to be monitored by means of a zero indicator 25 indicating any phase failure. An amplifier can be used as a zero indicator for switching between two states, depending upon a positive or a negative voltage being applied to its input. The triggering level is preferably chosen to be $U_0=\pm 0$ v. In accordance with Equation 9 the triggering level is given by the following relationship:

$$U_G\cdot\frac{R2}{R1+R2}=U_W \tag{10}$$

When inserting in Equation 10 the values of Equations 2 and 3 the following applies to the triggering level:

$$\sin\left(y+\frac{\Pi}{3}\right)+\frac{2}{\Pi}\cdot\frac{R2}{R1+R2}\cdot\left(0.5+\frac{50-p}{100}\cos y+\sin\frac{\Pi}{3}\cdot\sin y\right)=1 \tag{11}$$

Considering Equation 1, it becomes obvious that the triggering level is exclusively governed by the undervoltage percentage $p$, whereas the absolute value of the line voltage which expresses itself in the peak voltage $U_S$ exerts no influence.

Needless to say, the values for T, D1 and D2 in accordance with FIG. 4 can be so chosen that $U_{BE}$ becomes equal to $U_D$. If not, the semiconductor forward voltage drops are not completely compensated and the limit depends to a certain degree on the peak voltage $U_S$ (and upon the line voltage). The case of $U_{BE} > U_D$ is of particular interest. It can be seen from the preceding equations that in the latter case as the peak voltage $U_S$ decreases the limit is reached at a slightly lower undervoltage percentage $p$ than in instances where the value for $U_S$ is higher. This means that at a low line voltage a phase failure is recognized at a lower single-phase load that means at a lower unbalance of the three-phase transformer.

Figure 5:
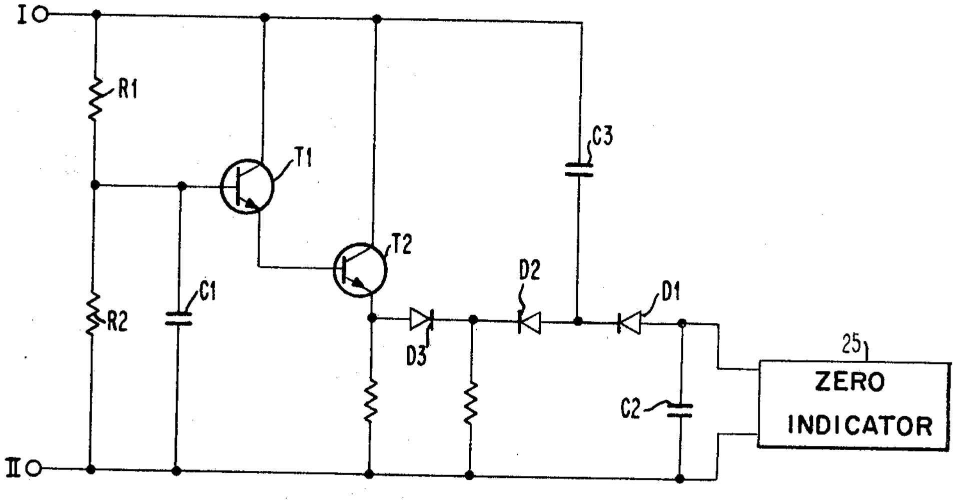
FIG. 5 is a modified arrangement of the circuit in accordance with FIG. 4.

To this end the circuit in accordance with FIG. 5 is used. The transistor T in accordance with FIG. 4 is replaced by two transistors T1 and T2, preferably silicon transistors. This known Darlington circuit is enhanced in its operation by a diode D3. This diode serves the purpose of protecting T1 and T2 against unduly high base-emitter voltages $U_{BE}$ when the circuit first becomes live and C3 is uncharged. The following relationship applies to the circuit in accordance with FIG. 5:

$$U_{BE} = U_{BET1} + U_{BET2} + U_{D3}$$
$$U_D = U_{D1} + U_{D2}$$

It is readily recognizable that $U_{BE}$ is > than $U_D$.

Figure 6:
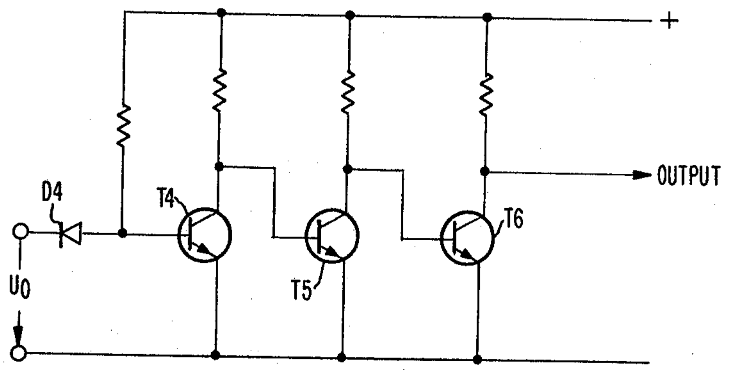
FIG. 6 is a circuit diagram of a zero indicator in accordance with FIGS. 4 and 5.

The connected zero indicator 25 can be designed in accordance with FIG. 6. The transistors T4, T5 and T6 are connected to the diode D4. The latter diode should preferably have the same characteristics as the base-emitter diode of the transistor T4 so that voltage drops are compensated. As long as $U_0$ is positive D4 is blocked, T4 is conductive, T5 is blocked, T6 is conductive, etc. If $U_0$ is negative, D4 is conductive, T4 is blocked, T5 is conductive, T6 is blocked, etc. The limit in the example is $\pm 0$ v., provided D4 and T4 are identical.

Figure 7:
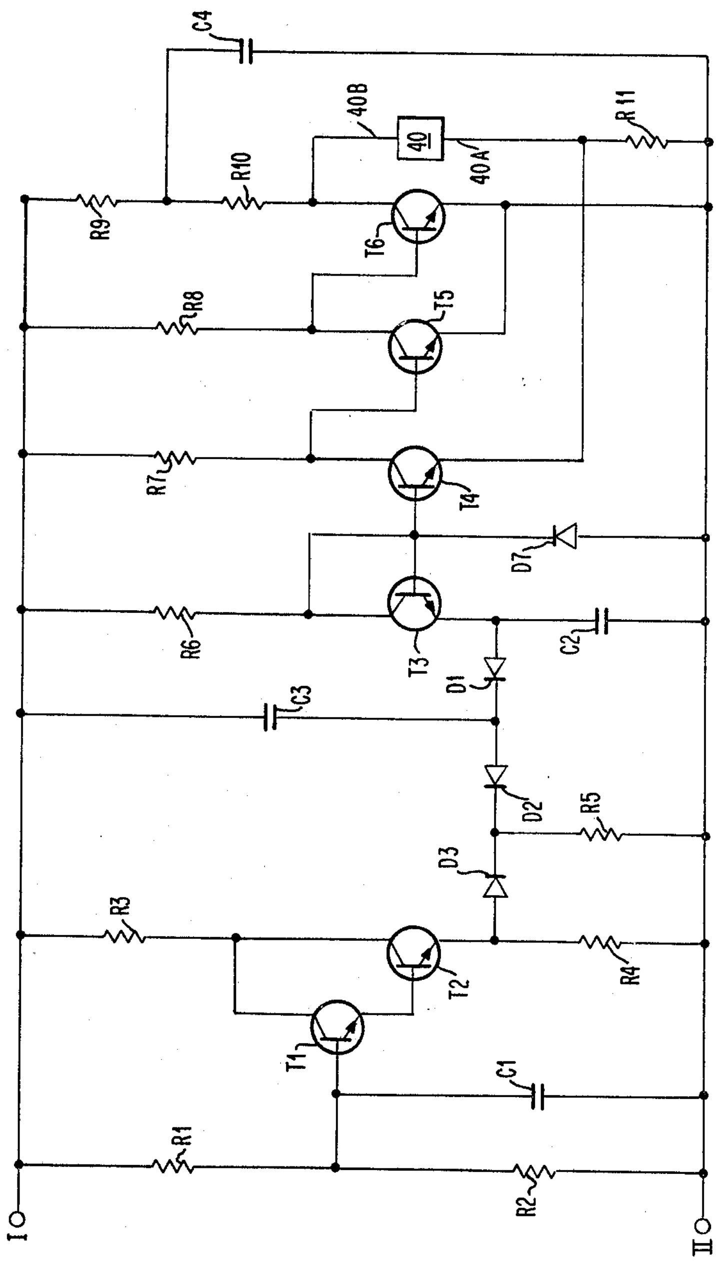
FIG. 7 is a complete circuit diagram of an embodiment of the invention.

FIG. 7 shows the complete circuit of the arrangement of the invention in accordance with FIGS. 5 and 6. To obtain a close similarity between the diode D4 in accordance with FIG. 6 and the transistor T4, the circuit of FIG. 7 uses a transistor T3 which is connected like a diode.

Where the voltage drop in the case of a phase failure is as substantial as shown in FIG. 2C, $U_W$ rises in a manner that $U_0$ becomes negative and the base-emitter breakdown voltage of T4 is exceeded. The circuit in accordance with FIG. 7 includes a diode D7 for the protection of T4.

The circuit of FIG. 7 also includes a switchable amplifier 40 whose output 40A switches from one discrete value to another in response to an appropriate change in the signal applied to its input 40B from the output of transistor T6 of the zero indicator. In a normal case, where no phase failure has occurred, T6 is conductive and the amplifier 40 is in a first discrete state for which no output current flows so that no voltage drop occurs across the resistor R11. The value of the emitter of T4 thus is 0 v. The triggering level is $U_0 = \pm 0$ v. Where after a phase failure the amplifier 40 is switched to its other discrete state, a current then flows to resistor R11 to generate a voltage drop of about 50 mv. which is passed on to the emitter of T4 so that the triggering level is shifted from 0 v. to $U_0 \approx +50$ mv. Thus R11 introduces a hysteresis which prevents "fluttering." If the resistor R11 were not provided and the secondary voltage drop resulting from a phase failure is great enough to cause the switching voltage to be achieved, the amplifier 40 would be switched on or off at random by the slightest voltage variations since the limit of the amplifier cannot be stable. The additional hysteresis provided by resistor R11 eliminates this in stability since, if the amplifier 40 has just been switched, $U_W$ must decrease by an additional 50 mv. on account of the hysteresis before the amplifier 40 will switch back.

The capacitor C4 smoothes the D.C. input voltage applied to amplifier 40. The complete circuit arrangement in accordance with the invention is operated by the voltage on the terminals I and II. Additional auxiliary voltages are not required.

By way of example, the following illustrative circuit values are provided for FIG. 7:

| | | |
|---|---|---|
| R1 | ohms | 13,300 |
| R2 | do | 4,750 |
| R3 | do | 2,200 |
| R4 | do | 3,300 |
| R5 | do | 750 |
| R6 | do | 470,000 |
| R7 | do | 160,000 |
| R8 | do | 8,200 |
| R9 | do | 390 |
| R10 | do | 390 |
| R11 | do | 22 |
| C1 | microfarad | 33 |
| C2 | do | 2.2 |
| C4 | do | 33 |

While the invention has been particularly shown and described with reference to preferred embodiments thereof, it will be understood by those skilled in the art that various changes in form and details may be made therein without departing from the spirit and scope of the invention.

What is claimed is:

1. A circuit for the detection of phase failures in a three-phase power system comprising a three-phase transformer having primary and secondary windings, full-wave rectifier means coupled to said secondary windings, for producing a D.C. output having an A.C. ripple corresponding to the rectified combined waveform output of said secondary windings, first means coupled to said rectifier means for providing a first signal related to the mean D.C. value of the combined output therefrom, second means coupled to said rectifier means for providing a second signal related to the value of said A.C. ripple of the combined output therefrom, comparison means for providing an output signal indication of phase failure by comparing the magnitudes of said first and second signals, and coupling means for applying said first and second signals to said comparison means for comparison thereby, wherein said first and second means are constructed and arranged so that said first signal exceeds said second signal when no phase failure is present and vice versa when a phase fails, and wherein said comparison means is constructed and arranged to switch from one state to another state in response to said first signal becoming equal to said second signal.

2. The invention in accordance with claim 1, wherein said first means includes a voltage divider, and wherein said second means includes a peak voltage rectifier.

3. The invention in accordance with claim 1, wherein said comparison means includes a switchable amplifier and hysteresis means coupled to said comparison means, said hysteresis means cooperating with said amplifier so as to cause the triggering level for switching said amplifier from a first state to a second state to be different from that required for switching said amplifier from the second state to the first state.

4. The invention in accordance with claim 1, wherein said comparison means is a differential amplifier, and wherein said coupling means serves to couple said first input signal to one input of said differential amplifier and said second signal to the other input of said differential amplifier.

5. The invention in accordance with claim 1, wherein said coupling means is constructed and arranged so that said first and second signals are applied in an opposite polarity serial relationship with respect to said comparison means, and wherein said comparison means is a zero indicator.

References Cited

UNITED STATES PATENTS

| | | | |
|---|---|---|---|
| 2,993,172 | 7/1961 | Karlicek | 324—140 XR |
| 3,013,185 | 12/1961 | Forsyth et al. | 317—27 |
| 3,160,786 | 12/1964 | Faglie | 317—27 |
| 3,160,787 | 12/1964 | Sonnemann | 317—27 XR |

| | | | |
|---|---|---|---|
| 3,184,644 | 5/1965 | Faglie | 317—27 XR |
| 3,248,610 | 4/1966 | Faglie | 317—47 XR |

OTHER REFERENCES

Comer, D. J.: Analog Ratio Detector, IBJM Technical Disclosure Bulletin, vol. 6, No. 5, October 1963.

GERARD R. STRECKER, Primary Examiner

U.S. Cl. X.R.

317—27